United States Patent [19]

Heintzelman

[11] 4,123,998

[45] Nov. 7, 1978

[54] FLAME DEFLECTOR FOR THE AUXILIARY COMBUSTION CHAMBER OF AN INTERNAL COMBUSTION ENGINE

[76] Inventor: Leo A. Heintzelman, 4990 Burlingame, Wyoming, Mich. 49509

[21] Appl. No.: 667,021

[22] Filed: Mar. 15, 1976

[51] Int. Cl.² ............................................. F02B 19/18
[52] U.S. Cl. .............. 123/32 K; 123/32 SP; 123/191 S; 123/191 SP; 313/143
[58] Field of Search ............... 123/32 C, 32 D, 32 K, 123/32 L, 32 AH, 32 SP, 143 P, 148 A, 169 PA, 191 S, 191 SP; 313/143

[56] References Cited

U.S. PATENT DOCUMENTS

| | | | |
|---|---|---|---|
| 1,020,503 | 3/1912 | Holden | 313/143 |
| 1,320,115 | 10/1919 | Bloomhuff | 313/143 |
| 1,357,661 | 11/1920 | Vail | 313/143 |
| 1,732,827 | 10/1929 | Adam | 313/143 |
| 1,776,449 | 9/1960 | Powell | 313/143 |
| 2,855,908 | 10/1958 | Pflaum | 123/32 D |
| 2,878,299 | 3/1959 | Starr | 123/32 SP |
| 3,416,501 | 12/1968 | Castelet | 123/148 A |
| 3,710,764 | 1/1973 | Jozlin | 123/32 SP |
| 3,926,158 | 12/1975 | Dolza, Jr. | 123/191 S |

FOREIGN PATENT DOCUMENTS 535,029  10/1955  Italy ....................................... 123/32 SP

*Primary Examiner*—Charles J. Myhre
*Assistant Examiner*—Jeffrey L. Yates
*Attorney, Agent, or Firm*—Gordon W. Hueschen

[57] ABSTRACT

An internal combustion engine is provided with a relatively small auxiliary combustion chamber opening into a main combustion chamber, a spark plug adapted to ignite a combustible mixture in the auxiliary combustion chamber, and a deflector means for causing the flame initiated in the auxiliary combustion chamber to fan out into the main combustion chamber.

2 Claims, 15 Drawing Figures

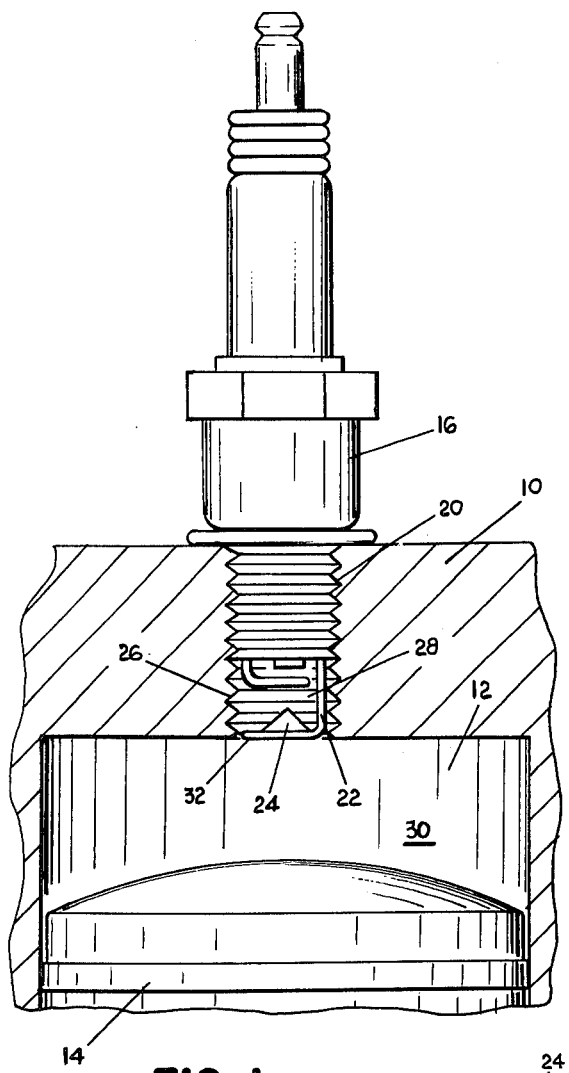
FIG.1
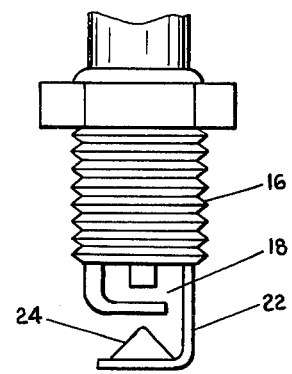
FIG.2
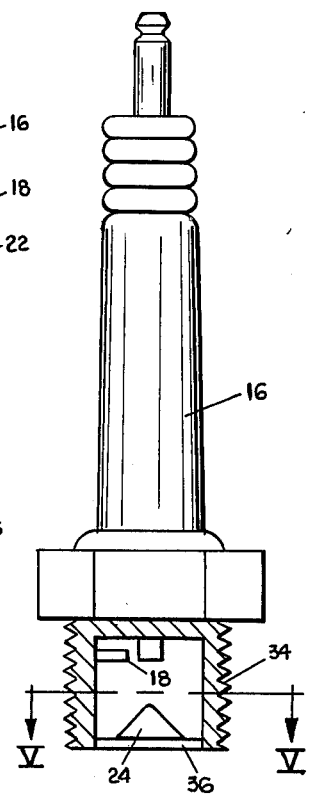
FIG.3
FIG.4
FIG.5
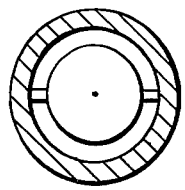
FIG.8
FIG.7
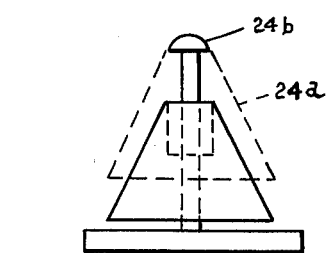
FIG.9
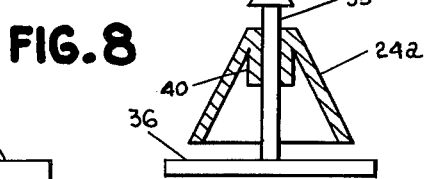
FIG.6
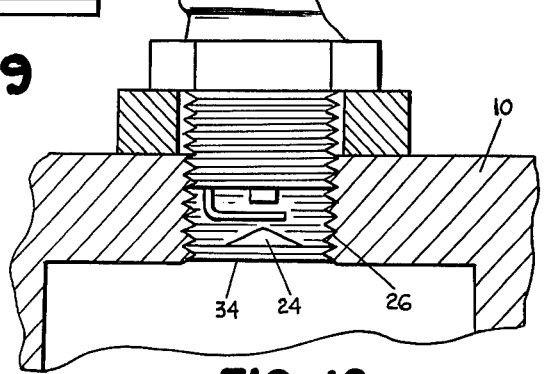
FIG.10

FLAME DEFLECTOR FOR THE AUXILIARY COMBUSTION CHAMBER OF AN INTERNAL COMBUSTION ENGINE

FIELD OF INVENTION
PRIOR ART

This invention relates to an internal combustion engine and a method for operating the same as well as a sub-combination thereof and is particularly directed to apparatus and methods which make it possible to operate with leaner mixtures and to obtain more complete combustion than heretofore possible.

OBJECT OF THE INVENTION

It is an object of the invention to provide a new and improved internal combustion engine and a new and improved method for operating the same. It is a further object of the invention to provide method and apparatus which will operate efficiently on lean mixtures. A further object of the invention is to provide method and apparatus which gives more complete combustion.

Another object of the invention is to provide a new and improved spark plug. Still another object of the invention is to provide a spark plug which makes possible the burning of a leaner mixture. Still another object of the invention is to provide a spark plug which will result in more complete combustion.

Further objects of the invention will become apparent as the description proceeds.

BRIEF DESCRIPTION OF THE INVENTION

The invention is directed to an internal combustion engine and method which comprises a relatively small auxiliary combustion chamber opening into a main combustion chamber, spark plug means for igniting a combustible mixture in the auxiliary combustion chamber, and deflector means adapted to cause the flame formed in the auxiliary combustion chamber to fan out into the main combustion chamber.

The invention may be embodied in different forms as long as deflector means is provided below the spark gap of the spark plug and adjacent the outlet of the auxiliary combustion chamber which deflector means is constructed and arranged to cause the flame formed in the auxiliary combustion chamber to fan out into the main combustion chamber.

One such modification comprises an ordinary spark plug in which a threaded skirt does not extend below the spark gap with a conical deflector supported below the spark gap with the apex adjacent thereto and in the centerline of the spark plug by support means depending from the skirt of the spark plug. When such a spark plug is screwed into a properly dimentioned bore in the cylinder head of an internal combustion engine, the deflector means will be located adjacent the bottom of the bore so that the flame initiated in the bore will be deflected by the conical deflector and caused to fan out into the main combustion chamber.

Alternatively, the spark plug may have a skirt which depends below the spark gap to provide the auxiliary combustion chamber, in which case the conical deflector is affixed to the skirt.

In another form of the invention the conical deflector is mounted in the bore in the cylinder head and is not affixed to the spark plug. The support means for the conical deflector may be threaded so that it can be screwed into the bore to the proper location or it may be supported therein by split rings or any other suitable means.

In another form of the invention the conical deflector may be affixed to be an integral part of the cylinder head.

In still another modification the conical deflector may be mounted for movement to and from adjacent the spark gap so that on the compression stroke, the conical deflector will move toward the spark gap and on the ignition of the combustible mixture in the auxiliary chamber it will move down to a position where the flame will be fanned out into the main combustion chamber.

BRIEF DESCRIPTION OF THE DRAWINGS

In the drawings,
FIG. 1 is a fragmentary side elevation in partial section showing one form of the invention.
FIG. 2 is a detailed view of the spark plug of FIG. 1.
FIG. 3 is a detailed view partly in section of a modified spark plug.
FIG. 4 is a detailed view of the deflector of FIG. 3.
FIG. 5 is a cross-section taken along lines 5—5 of FIG. 3.
FIG. 6 is a fragmentary view in partial section of a modified form of FIG. 3.
FIG. 7 is a detailed view of the deflector means of FIG. 6.
FIG. 8 is a planeview of FIG. 7.
FIG. 9 is a cross-section of FIG. 7.
FIG. 10 is a side elevation in partial section of another form of the invention.

DETAILED DESCRIPTION OF THE INVENTION

Figure 11:
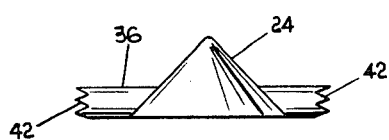
FIG. 11 is a side elevation of the deflector of FIG. 10.

Referring now particularly to FIGS. 1 and 2, there is shown an internal combustion engine comprising a cylinder head 10, cylinder 12, a piston 14, and a spark plug 16, having a spark gap 18. The spark plug has a threaded skirt 20 terminating just short of the spark gap 18. The threaded skirt 20 has an angular support 22 depending therefrom and supporting a conical deflector 24. The cylinder head 10 has a threaded bore 26 adapted to receive the threaded skirt 20 of the spark plug 16. The bore is of such length that the deflector 24 is positioned at the bottom of the cylinder head. The size of the deflector 24 is such as to provide an annular opening 32.

There is thus provided an anxiliary combustion chamber 28 and the main combustion chamber 30. The size of the conical deflector 24 is such as to provide an annular orifice 32 communicating between the two combustion chambers. Thus, when a combustible mixture is ignited in the auxiliary combustion chamber 28, the conical deflector 24 causes it to fan out through the annular opening 32 into the main combustion chamber 30.

Referring now particularly to FIGS. 3, 4, and 5, there is shown a modification in which the spark plug 16 has a skirt 34 which extends below the spark gap 18. The conical deflector 24 has a transverse support 36 affixed to the bottom thereof and having its ends affixed to the skirt 34. The skirt 34 therefore provides an auxiliary combustion chamber so that when the combustible mixture is ignited therein the flame passes out through the annular opening 32 and is deflected fan-wise by the conical deflector 24 into the combustion chamber.

Referring now more particularly to FIGS. 6, 7, 8, and 9, there is shown a modification in which the deflector 24 of FIG. 3 is mounted so that it is free to move toward and away from the spark gap 18. For this purpose the conical deflector 24 comprises a member 24a capped by member 24a which in the uppermost position cooperate to form a conical deflector. The member 24b is mounted on a vertical rod 38 which in turn is mounted on the transverse support 36. The member 24a has a collar 40 which surrounds the rod 38 and is slidable up and down on that rod. Thus, when the engine is on its compression stroke, the mixture rushing into the auxiliary combustion chamber 28 will force the member 24a to the position shown in dotted lines in FIG. 7. On ignition, if not before, the member 24a will drop to the position shown in the solid lines in FIG. 7.

Figure 12:
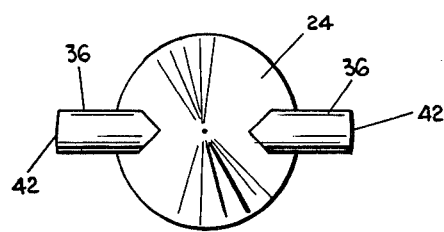
FIG. 12 is a plane view of FIG. 11.

Referring now to FIGS. 10, 11, and 12, there is shown a further modification in which the conical deflector 24 instead of being connected to the spark plug is connected to the cylinder head. The deflector 24 here is provided with a transverse support 36, the ends of which are threaded as shown at 42 with threads complementary to the internal threads of the bore 26. In other respects the operation and construction is as already described.

Figure 13:
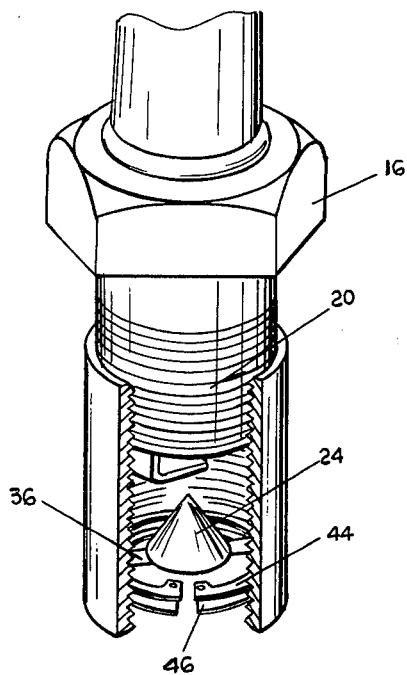
FIG. 13 is a fragmentary view of a modified form of the invention.
Figure 14:
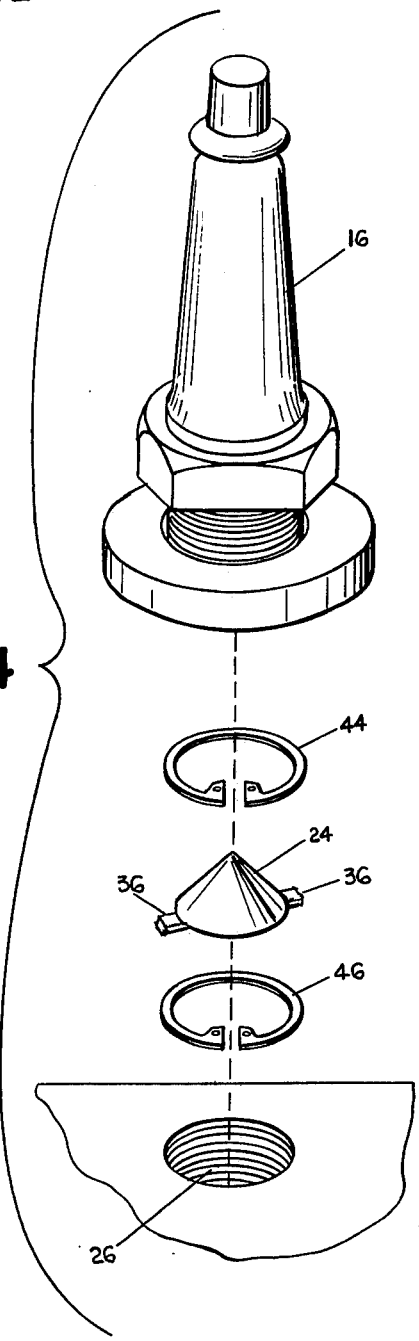
FIG. 14 is an exploded view of FIG. 13.

Referring now more particularly to FIGS. 13 and 14, there is illustrated a further modification of the invention in which the deflector 24 is mounted in the bore of the cylinder head as in FIG. 10, but is supported therein by two split rings 44 and 46 which clamp against and support the transverse support 36. Again the operations and functions are the same as above-described.

Figure 15:
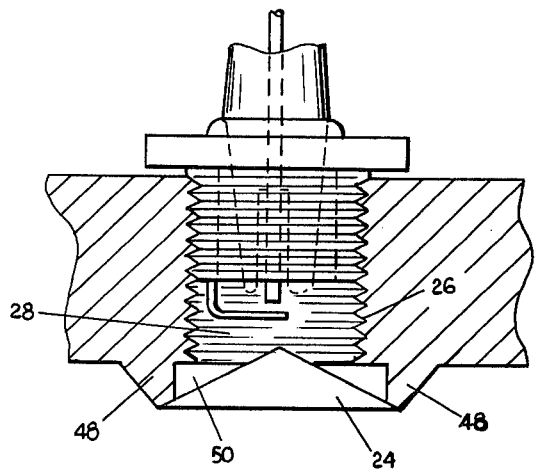
FIG. 15 is a partial view in partial section of a modified form of the invention.

Referring now to FIG. 15, there is shown a modification in which the conical deflector 24 is affixed to the bottom side of the cylinder head 10 by support 48.

Spaced about the periphery of the bore 26 to provide an annular aperture 50 through which the flame formed in the auxiliary combustion chamber 28 is caused to fan out into the main combustion chamber.

It is to be understood that the invention is not to be limited to the exact details of operation or structures shown and described, as obvious modifications and equivalents will be apparent to one skilled in the art.

I claim:

1. In an internal combustion engine having a cylinder, a cylinder head, a piston, a spark plug, and a main combustion chamber defined by said cylinder head, said cylinder, and said piston, the combination therewith of an auxiliary relatively small combustion chamber, spark plug means for igniting a combustible mixture in said auxiliary combustion chamber, and deflector means between said spark plug means and said main combustion chamber for causing the flame to fan out from said auxiliary combustion chamber into said main combustion chamber, in which the deflector means is supported by support means affixed to said cylinder head, in which said support means is fixed to a threaded bore in the cylinder head which bore also receives said spark plug means, and in which said support means comprises a transverse member having threads at its opposite ends complementary with the threads of said bore.

2. In an internal combustion engine having a cylinder, a cylinder head, a piston, a spark plug, and a main combustion chamber defined by said cylinder head, said cylinder, and said piston, the combination therewith of an auxiliary relatively small combustion chamber, spark plug means for igniting a combustible mixture in said auxiliary combustion chamber, and deflector means between said spark plug means and said main combustion chamber for causing the flame to fan out from said auxiliary combustion chamber into said main combustion chamber, and in which said support means comprises a transverse member and split rings adapted to engage said bore and said transverse member and to affix said transverse member in said bore.

* * * * *